(12) United States Patent
Garrett et al.

(10) Patent No.: US 9,069,416 B2
(45) Date of Patent: Jun. 30, 2015

(54) METHOD AND SYSTEM FOR SELECTING CONTENT USING A TOUCHSCREEN

(75) Inventors: Maryam Kamvar Garrett, Boston, MA (US); William J. Byrne, Davis, CA (US)

(73) Assignee: Google Inc., Mountain View, CA (US)

(*) Notice: Subject to any disclaimer, the term of this patent is extended or adjusted under 35 U.S.C. 154(b) by 774 days.

(21) Appl. No.: 12/731,770

(22) Filed: Mar. 25, 2010

(65) Prior Publication Data
US 2011/0239110 A1   Sep. 29, 2011

(51) Int. Cl.
| | | |
|---|---|---|
| *G06F 17/00* | (2006.01) | |
| *G06F 3/042* | (2006.01) | |
| *G06F 3/0488* | (2013.01) | |
| *G06F 15/02* | (2006.01) | |
| *G06F 3/041* | (2006.01) | |
| *G06F 3/0484* | (2013.01) | |
| *G06F 17/24* | (2006.01) | |

(52) U.S. Cl.
CPC .......... *G06F 3/0426* (2013.01); *G06F 3/04883* (2013.01); *G06F 2203/04808* (2013.01); *G06F 15/0225* (2013.01); *G06F 3/0412* (2013.01); *G06F 3/0425* (2013.01); *G06F 3/04842* (2013.01); *G06F 3/0488* (2013.01); *G06F 17/24* (2013.01)

(58) Field of Classification Search
CPC .............. G06F 3/0488; G06F 3/04883; G06F 2203/04808; G06F 17/24; G06F 15/0225; G06F 3/0412; G06F 3/0425; G06F 3/0426; G06F 3/04842
USPC .......................................... 715/256; 345/173
See application file for complete search history.

(56) References Cited

U.S. PATENT DOCUMENTS

| 5,068,739 A | 11/1991 | Filo |
| 5,815,142 A | 9/1998 | Allard et al. |
| 2006/0066588 A1* | 3/2006 | Lyon et al. ..................... 345/173 |

(Continued)

FOREIGN PATENT DOCUMENTS

| EP | 1 850 217 A2 | 10/2007 |
| JP | 2004-280532 A | 10/2004 |

(Continued)

OTHER PUBLICATIONS

International Search Report and Written Opinion mailed on Dec. 20, 2011, for co-pending international application No. PCT/US2011/029207.

(Continued)

*Primary Examiner* — Nathan Hillery
(74) *Attorney, Agent, or Firm* — Troutman Sanders, LLP; James E. Schutz; Jay R. Anderson

(57) ABSTRACT

Systems and methods allow a user to select a subset of displayed content using a touch screen. A user can touch the screen at or near a portion of the displayed content that the user would like to select. The touch module can display the selection of the selected portion on the touch screen using an indicator (e.g., highlighting, underlining, change in color). While the user continues to touch the screen, the selection of displayed content can expand to select additional content based on at least one rule. The rule(s) define how the selection of displayed content expands using characteristics of the user's touch. For example, these characteristics can include an amount of pressure exerted on the screen, a direction of finger roll at the point of contact with the screen, and an amount of time that the user has touched the screen.

24 Claims, 9 Drawing Sheets

(56) References Cited

U.S. PATENT DOCUMENTS

| | | | |
|---|---|---|---|
| 2006/0132457 A1* | 6/2006 | Rimas-Ribikauskas et al. | 345/173 |
| 2007/0247441 A1* | 10/2007 | Kim et al. | 345/173 |
| 2009/0228842 A1 | 9/2009 | Westerman et al. | |

FOREIGN PATENT DOCUMENTS

| | | |
|---|---|---|
| JP | 2006-185443 A | 7/2006 |
| JP | 2009-116906 A | 5/2009 |
| JP | 2010-049354 A | 3/2010 |
| WO | WO 2007/037806 | 4/2007 |

OTHER PUBLICATIONS

Buxton, Bill,: "Multi-Touch Systems that I Have Known and Loved," Jan. 12, 2007, retrieved from http://www.billbuxton.com/multitouchOverview.html.

* cited by examiner

METHOD AND SYSTEM FOR SELECTING CONTENT USING A TOUCHSCREEN

TECHNICAL FIELD

The present disclosure relates generally to methods and systems that allow a user to select displayed content using a touch screen, and more specifically, to methods and systems that allow a user to select a subset of displayed content by touching at or near a first portion of the subset and expanding the selection to include another, second portion based on at least one rule and/or certain characteristics of the touch.

BACKGROUND

A touch screen system allows a user to control operation of a computing device simply by touching a touch screen of the device. For example, a user can input a command to the device by touching on or near a designated portion of the touch screen. The touch screen system can provide an intuitive method by which the user can easily interact with and control various functions performed by the device. For example, the touch screen system can display icon elements representing a keyboard to allow a user to input text to the device.

Touch screens can be produced in a variety of types and sizes and can be used with or in a wide variety of computing devices, such as personal computers, portable consumer electronics (e.g., mobile telephones, personal digital assistants, handheld computers, video game devices, etc.), kiosks, domestic appliances, vehicle information systems (e.g., GPS locators), and industrial equipment and tools. In many cases, users can enter and modify text and other content displayed by the device via the touch screen. Conventional touch screen systems do not provide user friendly interfaces for selecting a subset of displayed content. For example, it is often difficult and frustrating for a user to select content on a small touch screen, such as a touch screen employed by a mobile phone.

Therefore, a need exists in the art for an improved means for selecting displayed content using a touch screen.

SUMMARY

In one exemplary embodiment, a computer-implemented method for selecting content via a touch screen includes detecting a touch by a user on a touch display that is displaying content. The touch module causes an indicator to be displayed on the touch display. The indicator indicates that a first portion of the displayed content has been selected, the first portion being located proximate a location of the touch on the touch display. While the user continues to touch the touch display, the touch module automatically expands the selection of the displayed content to include a second portion of the displayed content based on at least one rule and information regarding the user's touch. The touch module adjusts the indicator to indicate that the first portion and the second portion have been selected. The touch module is implemented in at least one computer system that includes instructions stored in a machine-readable medium and a processor that executes the instructions.

In another exemplary embodiment, a system for selecting content via a touch screen includes a touch display for displaying content and for detecting a touch from a user. The system also includes a computer system coupled to the touch display. The computer system includes a touch module that includes instructions stored in a machine-readable medium and a processor that executes the instructions. The touch module causes an indicator to be displayed on the touch display. The indicator indicates that a first portion of the displayed content has been selected, the first portion being located proximate a location of the touch on the touch display. While the user continues to touch the touch display, the touch module automatically expands the selection of the displayed content to include a second portion of the displayed content based on at least one rule and information regarding the user's touch. The touch module adjusts the indicator to indicate that the first portion and the second portion have been selected.

In yet another exemplary embodiment, a computer program product has a computer-readable storage medium having computer-readable program code embodied therein for selecting content via a touch screen. The computer program product includes computer-readable program code for detecting a touch by a user on a touch display that is displaying content; computer-readable program code for causing an indicator to be displayed on the touch display, the indicator indicating that a first portion of the displayed content has been selected, the first portion being located proximate a location of the touch on the touch display; computer-readable program code for, while the user continues to touch the touch display, automatically expanding the selection of the displayed content to include a second portion of the displayed content based on at least one rule and information regarding the user's touch; and computer-readable program code for adjusting the indicator to indicate that the first portion and the second portion have been selected.

These and other aspects, features and embodiments of the invention will become apparent to a person of ordinary skill in the art upon consideration of the following detailed description of illustrated embodiments exemplifying the best mode for carrying out the invention as presently perceived.

DETAILED DESCRIPTION OF EXEMPLARY EMBODIMENTS

Overview

Methods and systems allow a user to select displayed content using a touch screen. For example, the user can select the content for use in connection with a desired action to be performed in connection with the content. The user can touch a first portion of the displayed content, such as a character, word, or picture, that the user would like to select. The selection of the first portion can be indicated on the screen via highlighting, underlining, start and end indicators, change in text color, and/or other indicating means that would be known to a person of ordinary skill in the art having the benefit of the present disclosure. If the user continues to touch the screen, the selection of content can expand to include at least a second portion of the displayed content. For example, the selection can expand until the user stops touching the screen.

The expansion of content selection can be based upon a set of configurable rules that determine, among other things, how fast the selection expands and which direction the selection expands. For example, the speed of expansion can vary based on an amount of pressure that a user exerts on the screen and/or based on a direction of a finger roll, if any, by the user during the selection. After making a selection, the user can request an action to be performed in connection with the selected content. For example, the user may change the format of the selected content, copy and/or paste the selected content, or correct or otherwise edit the selected content.

System Architecture

Figure 1:
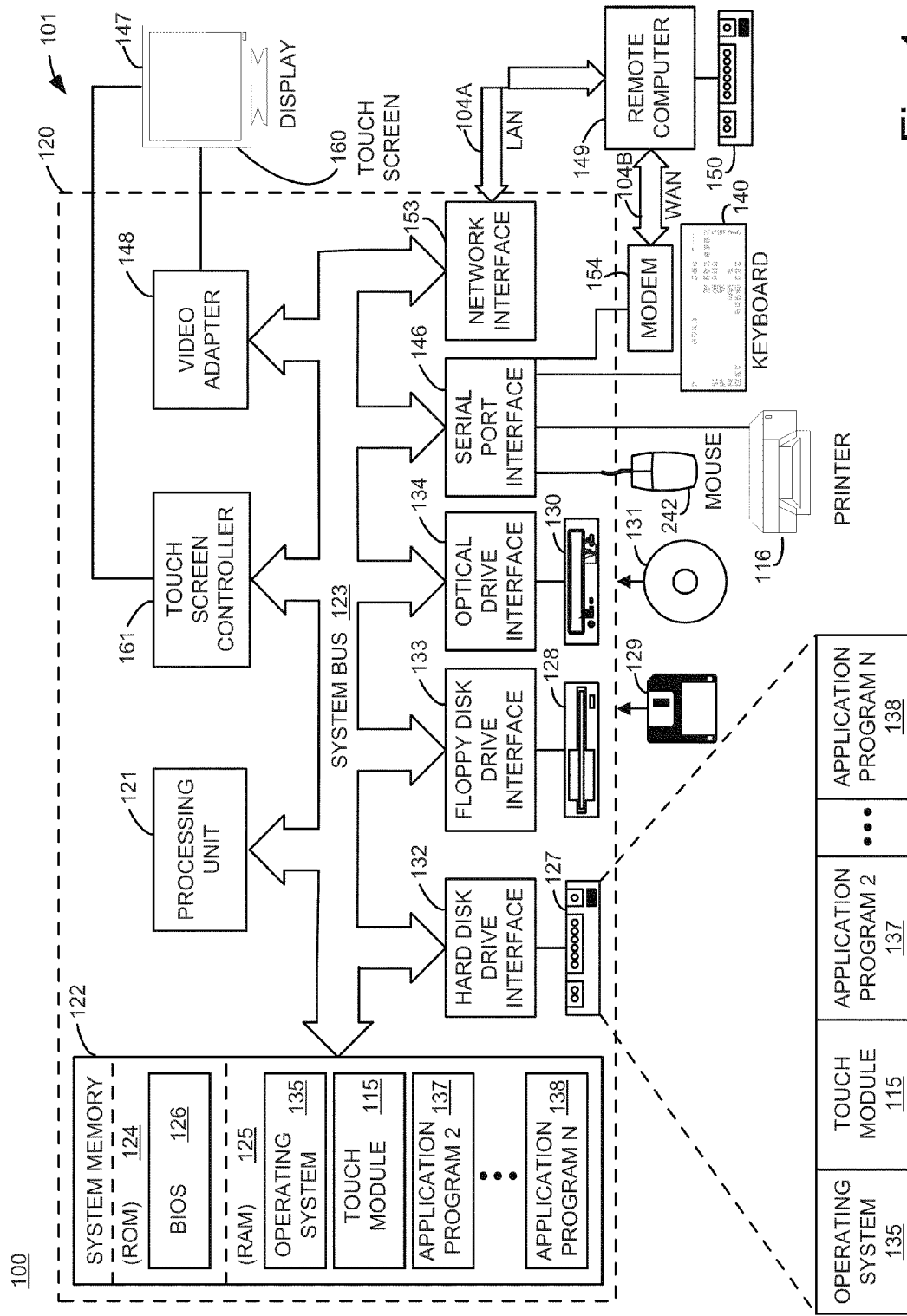
FIG. 1 is a block diagram depicting a system for performing an action in connection with content selected via a touch screen, in accordance with certain exemplary embodiments.

Turning now to the drawings, in which like numerals indicate like elements throughout the figures, exemplary embodiments are described in detail. FIG. 1 is a block diagram illustrating a system 100 for performing an action in connection with content selected via a touch screen 160, in accordance with certain exemplary embodiments. The system 100 is implemented in a computing device 101, such as a mobile phone, personal digital assistant ("PDA"), laptop computer, desktop computer, handheld computer, video game device, GPS locator, or any other wired or wireless processor-driven device. For simplicity, the exemplary device 101 is described herein as a personal computer 120. A person of ordinary skill in the art having the benefit of the present disclosure will recognize that certain components of the device 101 may be added, deleted, or modified in certain alternative embodiments. For example, a mobile phone or handheld computer may not include all of the components depicted in FIG. 1 and/or described below.

Generally, the computer 120 includes a processing unit 121, a system memory 122, and a system bus 123 that couples various system components, including the system memory 122, to the processing unit 121. The system bus 123 can include any of several types of bus structures, including a memory bus or memory controller, a peripheral bus, or a local bus, using any of a variety of bus architectures. The system memory 122 includes a read-only memory ("ROM") 124 and a random access memory ("RAM") 125. A basic input/output system (BIOS) 126 containing the basic routines that help to transfer information between elements within the computer 120, such as during start-up, is stored in the ROM 124.

The computer 120 also includes a hard disk drive 127 for reading from and writing to a hard disk (not shown), a magnetic disk drive 128 for reading from or writing to a removable magnetic disk 129 such as a floppy disk, and an optical disk drive 130 for reading from or writing to a removable optical disk 131 such as a CD-ROM, compact disk-read/write (CD/RW), DVD, or other optical media. The hard disk drive 127, magnetic disk drive 128, and optical disk drive 130 are connected to the system bus 123 by a hard disk drive interface 132, a magnetic disk drive interface 133, and an optical disk drive interface 134, respectively. Although the exemplary device 100 employs a ROM 124, a RAM 125, a hard disk drive 127, a removable magnetic disk 129, and a removable optical disk 131, it should be appreciated by a person of ordinary skill in the art having the benefit of the present disclosure that other types of computer readable media also can be used in the exemplary device 100. For example, the computer readable media can include any apparatus that can contain, store, communicate, propagate, or transport data for use by or in connection with one or more components of the computer 120, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer readable media can provide nonvolatile storage of computer-executable instructions, data structures, program modules, and other data for the computer 120.

A number of modules can be stored on the ROM 124, RAM 125, hard disk drive 127, magnetic disk 129, or optical disk 131, including an operating system 135 and various application modules 115, 137-138. Application modules 115, 137-138 can include routines, sub-routines, programs, objects, components, data structures, etc., which perform particular tasks or implement particular abstract data types. Application module 115, referred to herein as a "touch module" 115, is discussed in more detail below, with reference to FIGS. 2-9.

A user can enter commands and information to the computer 120 through input devices, such as a keyboard 140 and a pointing device 142. The pointing device 142 can include a mouse, a trackball, an electronic pen that can be used in conjunction with an electronic tablet, or any other input device known to a person of ordinary skill in the art, such as a microphone, joystick, game pad, satellite dish, scanner, or the like. These and other input devices are often connected to the processing unit 122 through a serial port interface 146 that is coupled to the system bus 123, but can be connected by other interfaces, such as a parallel port, game port, a universal serial bus (USB), or the like.

A display device 147 also can be connected to the system bus 123 via an interface, such as a video adapter 148, to receive content for display by the display by the display device 147. The display device 147 incorporates a touch screen 160 coupled to the processing unit 121 by way of a touch screen controller 161. For example, the touch screen 160 can include resistive, capacitive, surface acoustic wave ("SAW"), infrared ("IR"), strain gauge, dispersive signal technology, acoustic pulse recognition, and optical touch sensing technology, as would be readily understood by a person of ordinary skill in the art having the benefit of the present disclosure. The touch screen controller 161 can determine the location of a user's touch (e.g., with a finger, stylus, pen, or other object) on or near the touch screen 160.

In certain exemplary embodiments, the touch screen 160 may be pressure sensitive (e.g., resistive and capacitive touch screens). In these pressure sensitive embodiments, the touch screen controller 161 also can detect a level of pressure exerted on the pressure sensitive touch screen. The touch screen controller 161 can communicate a detection of a touch, along with the location and optionally the level of pressure of the touch, to the touch module 115 via the system bus 123. In addition to the display device 147, the computer 120 can include other peripheral output devices, such as speakers (not shown) and a printer 116.

The computer 120 is configured to operate in a networked environment using logical connections to one or more remote computers 149. The remote computer 149 can be any network device, such as a personal computer, a server, a client, a router, a network PC, a peer device, or other device. While the remote computer 149 typically includes many or all of the elements described above relative to the computer 120, only a memory storage device 150 has been illustrated in FIG. 1 for simplicity. The logical connections depicted in FIG. 1 include a LAN 104A and a WAN 104B. Such networking environments are commonplace in offices, enterprise-wide computer networks, intranets, and the Internet.

When used in a LAN networking environment, the computer 120 is often connected to the LAN 104A through a network interface or adapter 153. When used in a WAN networking environment, the computer 120 typically includes a modem 154 or other means for establishing communications over the WAN 104B, such as the Internet. The modem 154, which can be internal or external, is connected to system bus 123 via a serial port interface 146. In a networked environment, program modules depicted relative to computer 120, or portions thereof, can be stored in the remote memory storage device 150.

It will be appreciated that the network connections shown are exemplary and other means of establishing a communications link between the computers can be used. Moreover, those skilled in the art will appreciate that the device 100 illustrated in FIG. 1 can have any of several other suitable computer system configurations. For example, the device 100 may not include certain components, in alternative exemplary embodiments. In certain exemplary embodiments, each of the network devices 105 and 110-112 can include a structure similar to that described above in connection with the device 100.

Process

The components of the device 101 are described hereinafter with reference to the exemplary methods illustrated in FIGS. 2-7 and the exemplary screen shots depicted in FIGS. 8-9. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more steps described may be performed by hardware, software, or a combination thereof, as may be embodied in one or more computing systems.

Figure 2:
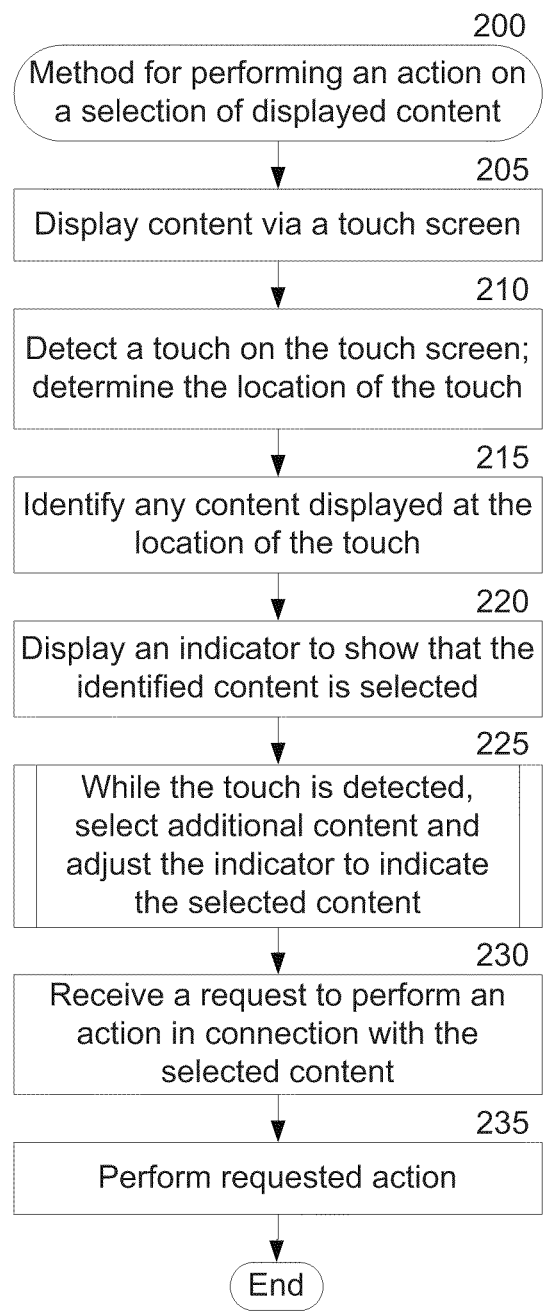
FIG. 2 is a flow chart depicting a method for performing an action in connection with content selected via a touch screen, in accordance with certain exemplary embodiments.

FIG. 2 is a flow chart depicting a method 200 for performing an action in connection with content selected via a touch screen 160, in accordance with certain exemplary embodiments. The method 200 may be performed using a computer program product having a computer-readable storage medium with computer program instructions embodied thereon for performing the method 200. The method 200 is described hereinafter with reference to FIGS. 1 and 2. Additionally, reference is made to FIG. 8, which is a block diagram 800 depicting a selection of displayed content 815 via a touch screen 160 using the exemplary method 200, in accordance with certain exemplary embodiments.

Figure 8:
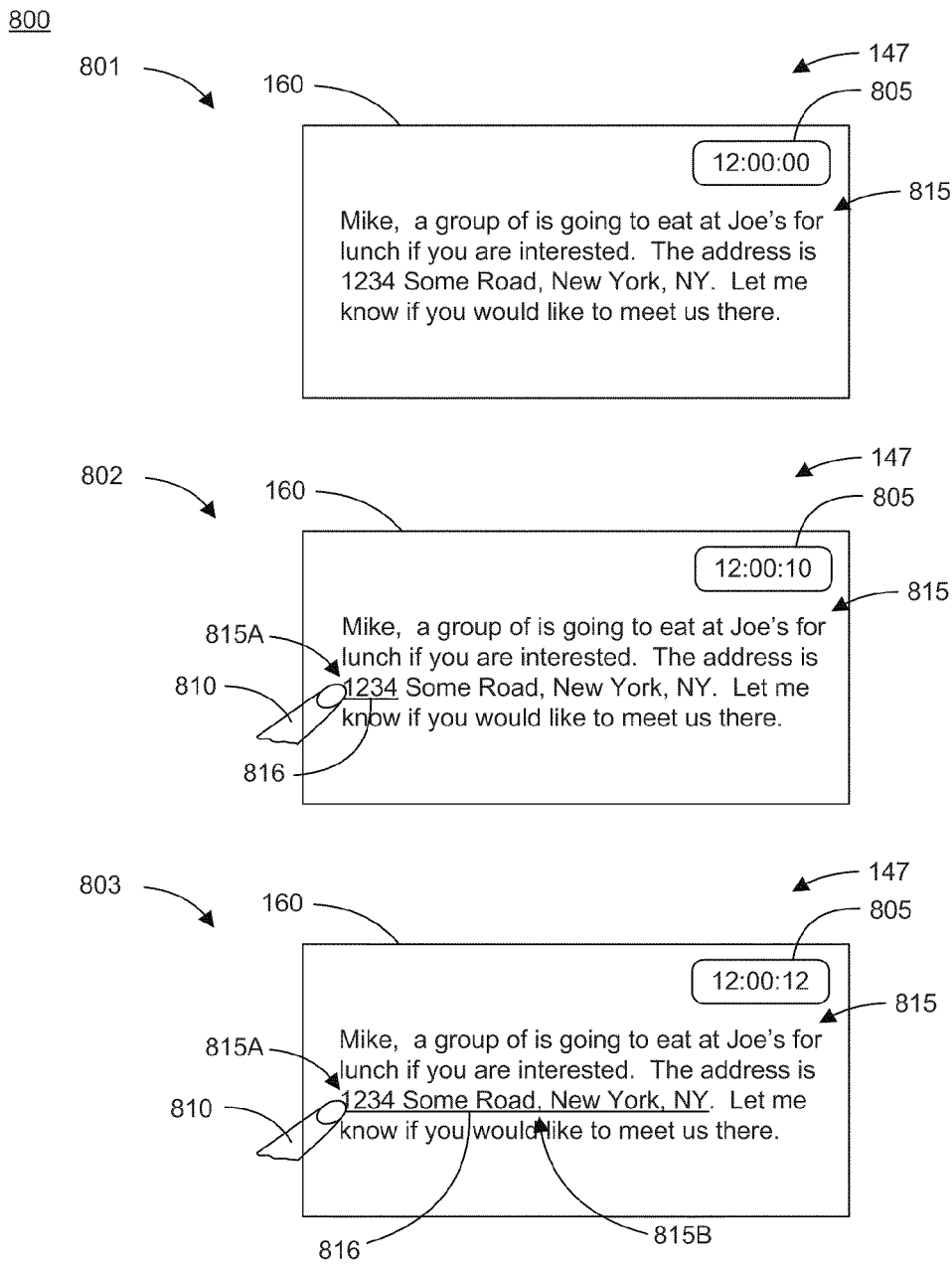
FIG. 8 is a block diagram depicting a selection of displayed content, in accordance with certain exemplary embodiments.
Figure 9:
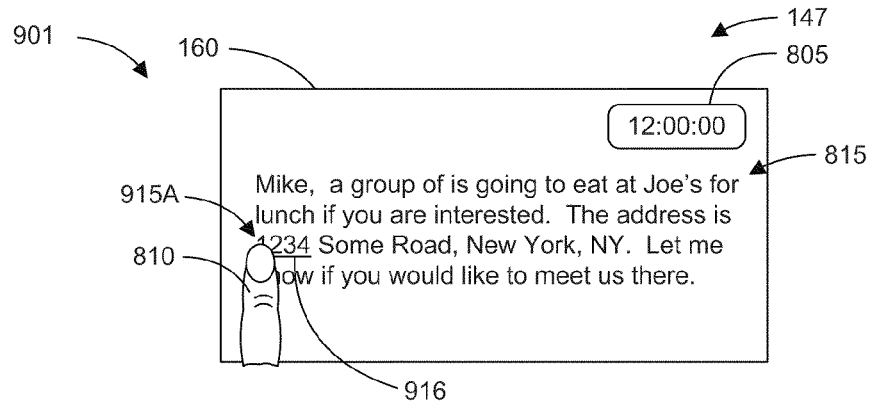
FIG. 9 is a block diagram depicting a selection of displayed content, in accordance with certain exemplary embodiments.
Figure 9:
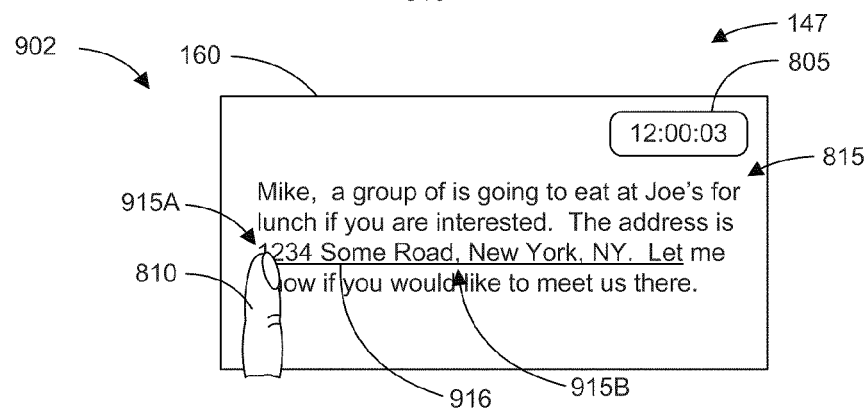
Figure 9:
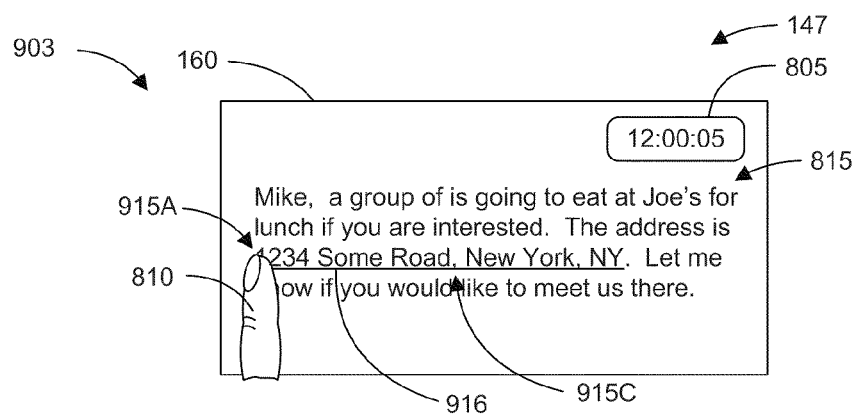

With reference to FIGS. 1-2 and 8, in step 205, content 815 is displayed via a touch screen 160 of a display device 147. In the exemplary embodiment depicted in FIG. 8, at a first time of 12:00:00 (as noted by a clock interface 805), the display device 147 displays an interface 801, which includes text 815. In certain alternative exemplary embodiments, the displayed content 815 can include text and/or non-text items, such as pictures, graphics, videos, hyperlinks, tables, charts, and any other types of content that can be displayed on a display device 147. In certain exemplary embodiments, the content 815 may be provided to the display device 147 by the operating system 135 or by one of the application modules 137-138. For example, the text 805 may be associated with or part of an e-mail, a text message, a note, a calendar entry, a word processor document, or another field or interface of an application 137-138.

In step 210, a touch is detected at the touch screen 160 by the touch controller 161. The touch controller 161 determines the location of the touch. For example, the location of the touch may be determined in relation to one or more pixels, or virtual pixels, of the touch screen 160. The touch controller 161 provides information regarding the touch, including the touch location, to the touch module 115. For example, a user may touch (e.g., with a finger, stylus, pen, or other object) the touch screen 160 at or near a displayed item to select that displayed item. In certain exemplary embodiments, the touch controller 161 also may determine, and provide to the touch module 115, information regarding a relative pressure of the touch on the touch screen 160.

In step 215, the touch module 115 identifies any content 815A displayed at the touch location. For example, the touch module 115 can interact with the operating system 135 to determine if an application module 137-138 is displaying content 815 at the location of the touch. If an application 137-138 is active at the location of the touch, the touch module 115 can interact with the application 137-138 that is active at the location of the touch to identify the content 815 displayed at the location of the touch. Other methods for identifying the content 815A would be readily apparent to a person of ordinary skill in the art having the benefit of the present disclosure.

In step 220, the text module 115 causes an indicator 816 to be displayed in connection with the identified content 815A, to indicate that the displayed content 815A is selected. In certain exemplary embodiments, the indicator 816 may include a highlight around the selected content 815A, underlining displayed under the selected content 815A, a change in color of the selected content 815A (e.g., text color), indicators, such as a brackets or pointers, defining a boundary around the selected content 815A, and/or any other means for identifying selected content 815A. For example, referring to view 802 of FIG. 8, at a time 12:00:10, a user has selected a portion of text 815A ("1234") by touching the touch screen 160 with a finger 810 at or near the portion 815A. In this example, the text module 115 caused an underline indicator 816 to be displayed under the selected portion 815A.

In certain exemplary embodiments, the touch module 115 causes the indicator 816 to be displayed without interacting with the application 137-138 with which the selected content 815A is associated. For example, the touch module 115 may determine the pixels or virtual pixels where the content is located and instruct the display system 147 to display the indicator at the appropriate pixels. In addition, or in the alternative, the touch module 161 can interact with the application 137-138 to cause the indicator 816 to be displayed. For example, if the application 137-138 is a word processor, the touch module 160 may cause the word processor to underline selected text, highlight the selected text, or otherwise indicate that the text has been selected.

In step 225, the touch module 115 expands the selection of displayed content 815 to include at least a second portion 815B of the content 815 for so long as the user continues to touch the touch screen 160. For example, view 803 of FIG. 8 depicts an expansion of the selected content 815 to include both the first portion 815A, which includes the text "1234," and an additional portion of text 815B, which includes the text "Some Road, New York, N.Y.," while the user touches the touch screen 160 from time "12:00:10" to time "12:00:12."

In certain exemplary embodiments, the expansion of selected content can be based upon at least one rule. The rule(s) can determine, among other things, how fast the selected content expands and in which direction the selection expands. The speed at which the selection expands can be defined as an amount of content selected per a given time period or a number of pixels or virtual pixels selected per a given time period. For example, a default speed can be one character or pixel per second. As would be recognized by a person of ordinary skill in the art having the benefit of the present disclosure, infinite different speeds may be utilized in different embodiments.

In certain exemplary embodiments, the rule(s) can control rate of expansion based on an amount of pressure exerted on the touch screen 160 during the touch and/or a direction that the user rolls its finger (or stylus, pen, or other object), if at all, during the touch. For example, an increased rate of expansion may be applied if the user exerts an amount of pressure that exceeds a predetermined threshold amount, and a decreased rate of expansion may be applied if the user exerts an amount of pressure that is below a predetermined threshold amount. Similarly, the rate of expansion may increase if the user rolls its finger in a forward direction, and the rate of expansion may decrease if the user rolls its finger in a backward direction. The predetermined thresholds may be defined by the computer or customized by the user. In yet another example, the additional content may be selected at a constant rate irrespective of touch characteristics or any other factors while the user continues to touch the screen 160.

As described below, the touch module 115 adjusts the indicator 816 so that it is associated with all of the selected content, including both the first portion 815A selected in step 220 and the second portion 815B added in step 225. For example, referring to view 803 of FIG. 8, the underline indicator 816 is displayed under both the first portion of text 815A and the second portion of text 815B. Step 225 is described in further detail below with reference FIGS. 3-7 and 9.

In step 230, a request is received to perform an action in connection with the selected content 815. In certain exemplary embodiments, a user may initiate the request using the application 137-138 with which the selected content 815 is associated. For example, the user may interact with a word processor to copy, edit, format, correct, suggest corrections or other actions for the content 815, and/or take another action in connection with the selected content 815. Referring to view 803 of FIG. 3, the selected text 815A and 815B includes the address, "1234 Some Road, New York, N.Y." In one example, the user may copy this address and paste the address into another program, such as a web browser or a GPS application, to obtain directions to the address.

The user may initiate the request using an input device, such as the keyboard 140, the pointing device 142, or the touch screen 160. Alternatively, the request may be initiated automatically upon selection of the content 815. For example, immediately upon releasing the user's touch, the touch module 115 or another application 137-138 may automatically copy, paste, reformat, correct, suggest corrections or other actions for the content 815, and/or take another action with the selected content 815. In step 235, the requested action is completed.

Figure 3:
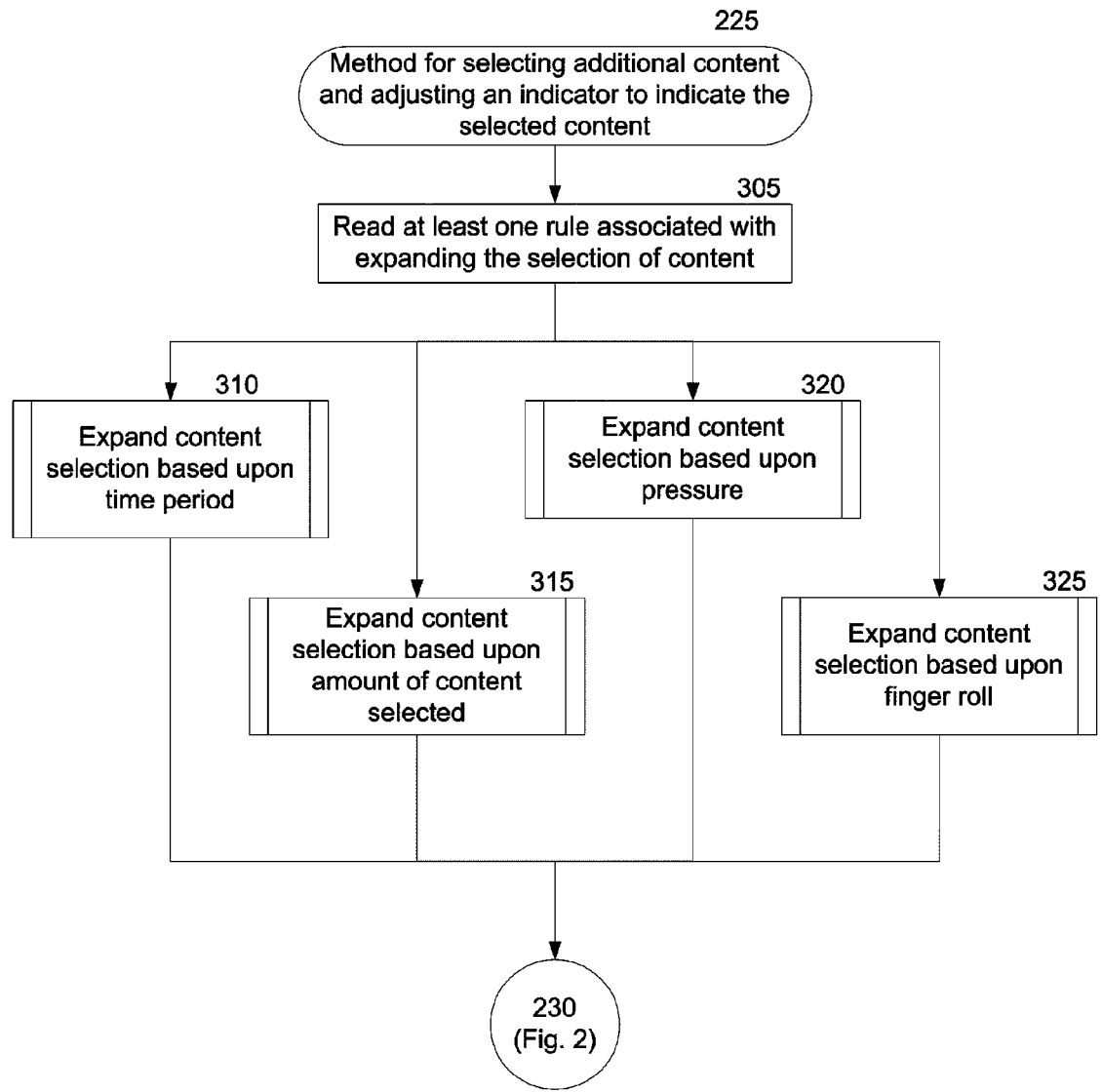
FIG. 3 is a flow chart depicting a method for selecting additional content and adjusting an indicator to indicate the selected content, in accordance with certain exemplary embodiments.

FIG. 3 is a flow chart depicting a method 225 for selecting additional content and adjusting an indicator to identify the selected content, in accordance with certain exemplary embodiments, as referenced in step 225 of FIG. 3. The method 225 is described below with reference to FIGS. 1-3.

In step 305, the touch module 115 reads at least one rule associated with expanding the initial selection of content (that was selected in steps 210-220 of the method 200). Each rule can define the speed and/or direction of the selection expansion, for example. In certain exemplary embodiments, one or more rules can define a type of indicator (e.g., highlighting, underlining, change in color, etc.) to be used to identify the selection.

The speed of expansion can be based upon a time period, an amount of content selected, and/or characteristics of a touch at the touch screen 160. For example, the speed can be based on an amount of pressure exerted on the touch screen 160 during the touch, an adjustment to the touch, such as a roll of a finger or other object, and/or how long the touch has remained active. The direction of expansion also can be based upon characteristics of the touch. For example, a finger roll to the right may cause the selection to expand in a rightward direction, and a finger roll to the left may cause the selection to expand in a leftward direction.

Steps 310-325 illustrate exemplary methods for expanding a selection of content based upon the rule(s) selected in step 305. In step 310, the selection expands based upon a time period. In step 315, the selection expands based on an amount of content selected. In step 320, the selection expands based upon an amount of pressure associated with the touch. In step 325, the selection expands based on a finger roll. Steps 310-325 are described below with reference to FIGS. 4-7, respectively. Although depicted in FIG. 3 as alternative methods for expanding a content selection, a person of ordinary skill in the art having the benefit of the present disclosure will recognize that content selection can be based on one or more different types of rules. For example, expansion may be based on a combination of considerations, such as time elapsed during a touch, pressure exerted during the touch, an amount of content selected during the touch, and/or any finger rolls detected during the touch, etc.

In each case, the touch module 115 adjusts the indicator to identify all selected content. In certain exemplary embodiments, the touch module 115 adjusts the indicator in real time or near real time so that the user can monitor the expansion of the content selection. For example, if the indicator is an underlining of text and the text expands at a rate of one character per second, the touch module 115 can extend the underlining one character per second until the user elects to stop the expansion. Alternatively, the touch module 115 may adjust the indicator only upon completion of the selection expansion.

Figure 4:
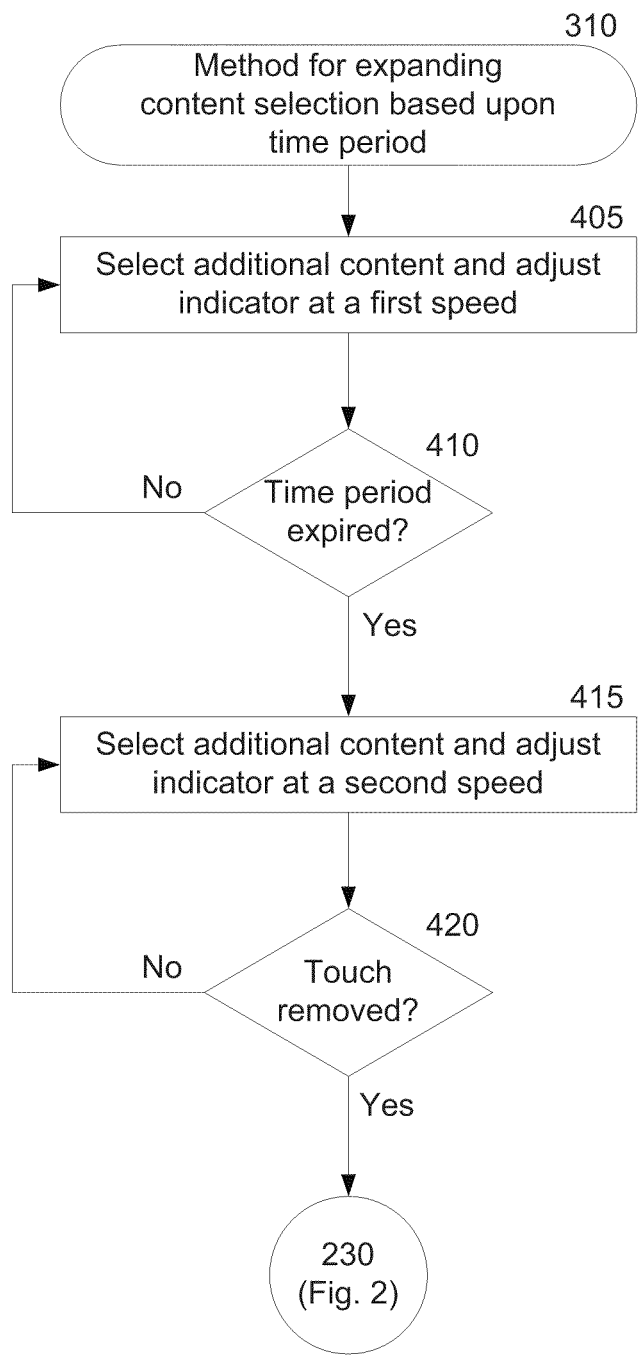
FIG. 4 is a flow chart depicting a method for expanding content selection based upon a time period, in accordance with certain exemplary embodiments.

FIG. 4 is a flow chart depicting a method 310 for expanding content selection based upon a time period, in accordance with certain exemplary embodiments, as referenced in step 310 of FIG. 3. The method 310 is described below with reference to FIGS. 1-4.

In step 405, the touch module 115 selects additional displayed content at a first speed while a touch remains active at the touch screen 160. In certain exemplary embodiments, this first speed may be a "slow" speed to allow the user to select a small amount of additional content before proceeding to a faster speed to select a large amount of additional content. For example, if a user is selecting text, the first, slower speed may be a rate of one character of expansion at a time, and the second, faster speed may be a rate of one word at a time. In the exemplary embodiment depicted in FIG. 4, the selection of content may expand at the first speed until a predetermined time period expires.

In addition, or in the alternative, the selection may expand at a particular speed until the user rolls a finger in a direction of expansion or contraction or applies greater or less pressure to the touch screen 160, indicating a desire to speed up or down the expansion. Although depicted in FIG. 4 as only having two different speeds, a person of ordinary skill in the art having the benefit of the present disclosure will recognize that any number of different speeds may be applied in certain alternative exemplary embodiments. The speeds, applicable time periods, and any other applicable thresholds or rules may be fixed or user configurable.

In step 410, the touch module 115 determines whether the time period for the first speed has expired while the user continues to maintain the touch at the touch screen 160. If the time period has expired, the method 410 proceeds to step 415. If the time period has not expired, the method 410 returns to step 405 to continue to select additional content at the first speed until the time period expires or the user ceases touching the touch screen 160.

In step 415, the touch module 115 expands the selection at the second speed. As described above, the second speed generally is faster than the first speed. Alternatively, the second speed may be slower than the first speed.

In step 420, the touch module 115 determines whether the touch has been removed. Although this step 420 is depicted as occurring after step 415, the touch module 115 can continuously interact with the touch screen controller 161 to determine whether the touch is active or has been removed. While the touch remains active, the touch module 115 can select additional content and adjust the indicator at either the first speed or at the second speed depending on whether the time period has expired. After the touch is removed, the method 410 proceeds to step 230 of the method 200, as referenced in FIG. 2.

Figure 5:
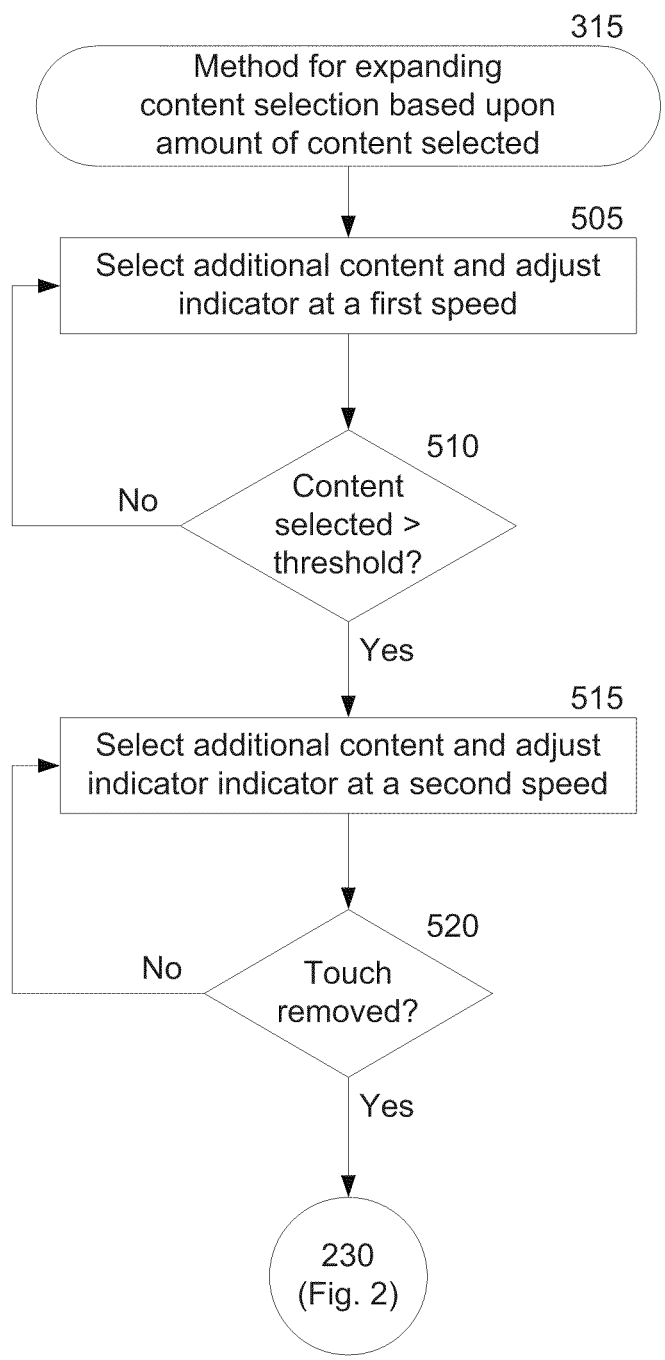
FIG. 5 is a flow chart depicting a method for expanding content selection based upon an amount of content selected, in accordance with certain exemplary embodiments.

FIG. 5 is a flow chart depicting a method 315 for expanding content selection based upon an amount of content selected, in accordance with certain exemplary embodiments, as referenced in step 315 of FIG. 3. The method 315 is described below with reference to FIGS. 1-3 and 5.

In step 505, the touch module 115 selects additional displayed content at a first speed while a touch remains active at the touch screen 160. Also, the touch module 115 adjusts an indicator for indicating the selected content on the touch screen 160 with the selection. Similar to the method 310 described above, this first speed may be a "slow" speed to allow the user to select a small amount of additional content before proceeding to a faster speed to select a large amount of additional content. However, in this exemplary method 315, additional content continues to be selected at the first speed until a predetermined amount of content is selected. For example, if the content includes text, the first speed may be defined as one character at a time. In this example, the predetermined amount of selected content may be a number of text characters, a word boundary (i.e., an entire word has been selected), or a number of words.

In step 510, the touch module 115 determines whether the predetermined amount of content has been selected while the user continues to maintain the touch as the touch screen 160. If the predetermined amount of content has been selected, the method 315 proceeds to step 515. If the predetermined amount of content has not been selected, the method 315 returns to step 505 to continue to select additional content until the predetermined amount of content is selected or the user removes the touch from the touch screen 160.

In step 515, the touch module 115 selects additional displayed content at a second speed and adjusts the indicator to indicate the selected content at the second speed. As described above, this second speed may be a "fast" speed, which is faster than the first speed. Alternatively, the second speed may be slower than the first speed.

In step 520, the touch module 115 determines whether the touch has been removed. Although this step is depicted as occurring after step 515, the touch module 115 can continuously interact with the touch screen controller 161 to determine whether the touch is active or has been removed. While the touch remains active, the touch module 115 can select additional content and adjust the indicator at either the first speed or at the second speed depending on whether the predetermined amount of content has been selected. After the touch is removed, the method 315 proceeds to step 230 of the method 200, as referenced in FIG. 2.

Figure 6:
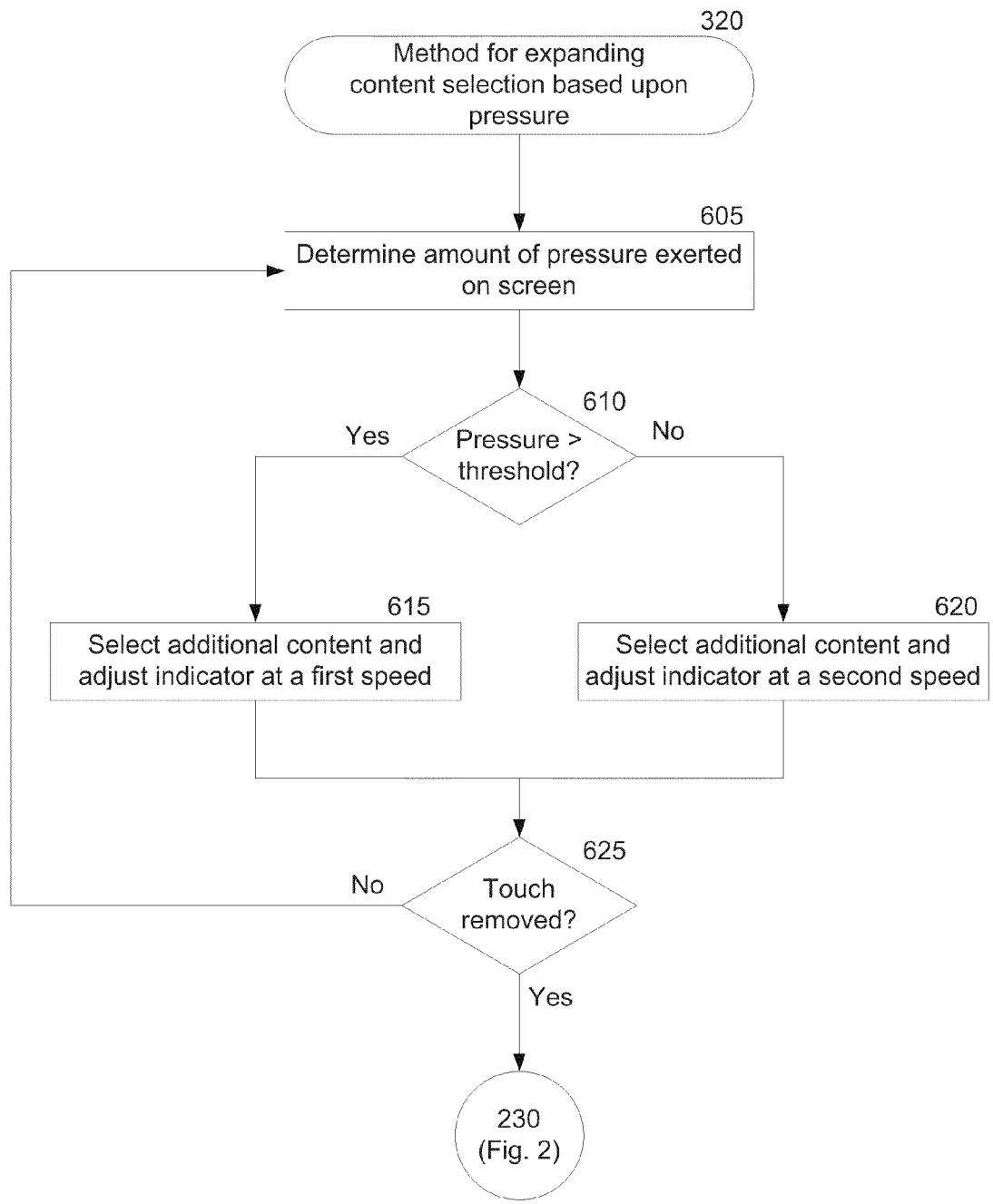
FIG. 6 is a flow chart depicting a method for expanding content selection based upon an amount of pressure exerted on the touch screen of FIG. 1, in accordance with certain exemplary embodiments.

FIG. 6 is a flow chart depicting a method 320 for expanding content selection based upon an amount of pressure exerted on the touch screen 160, in accordance with certain exemplary embodiments, as referenced in step 320 of FIG. 3. The method 320 is described below with reference to FIGS. 1-3 and 6.

In step 605, the touch module 115 interacts with the touch screen controller 161 to determine an amount of pressure exerted on the touch screen 160 at the location of the user touch. In step 610, the touch module 115 compares the pressure exerted on the touch screen 160 to a threshold to determine the speed for expanding the content selection. If the pressure exerted on the touch screen 160 exceeds the threshold, the method 320 branches to step 615 where the touch module 115 expands the selection at a first speed. If the pressure exerted on the touch screen 160 does not exceed the threshold, the method 320 branches to step 620 where the touch module 115 expands the selection at a second speed.

In certain exemplary embodiments, the first speed can be faster than the second speed. Thus, the user may exert more pressure on the touch screen 160 to select additional content at a faster pace. Likewise, the user may exert less pressure on the touch screen 160 to select additional content at a slower pace. Although only two speeds are depicted in the exemplary method 320, one of ordinary skill in the art having the benefit of the present disclosure would appreciate that the method 320 could employ more than two speeds corresponding to more than two pressure thresholds.

In step 625, the touch module 115 determines whether the touch has been removed. Although this step is depicted as occurring after steps 615 and 620, the touch module 115 can continuously interact with the touch screen controller 161 to determine whether the touch is active or has been removed. While the touch remains active, the touch module 115 can continue to monitor the amount of pressure exerted on the touch screen 160 at the location of the touch and select additional content and adjust the indicator in accordance with the amount of pressure. After the touch is removed, the method 320 proceeds to step 230 of the method 200, as referenced in FIG. 2.

Figure 7:
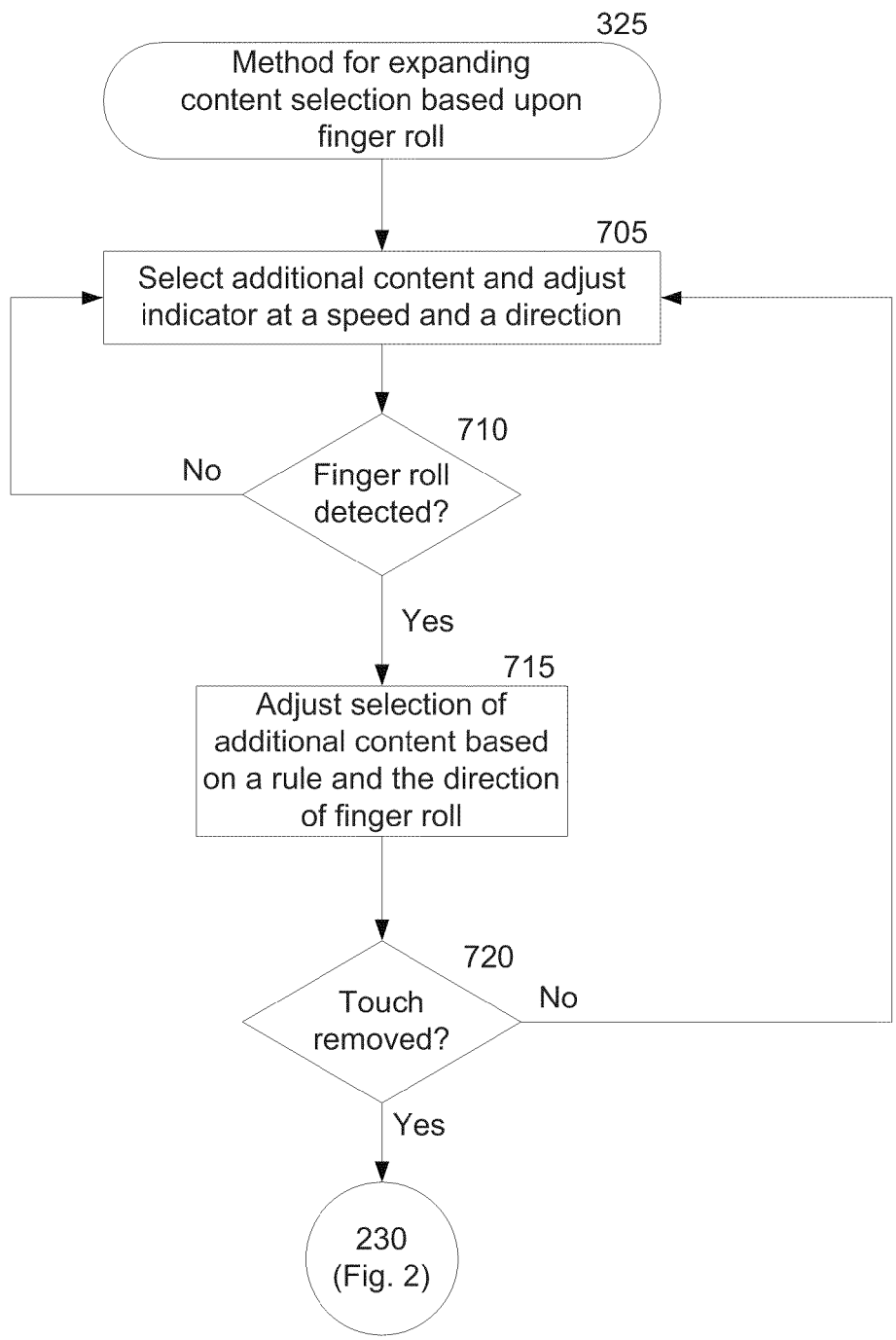
FIG. 7 is a flow chart depicting a method for expanding content selection based upon a roll of a user's finger, in accordance with certain exemplary embodiments.

FIG. 7 is a flow chart depicting a method 325 for expanding content selection based upon a roll of a user's finger, in accordance with certain exemplary embodiments. This exemplary method 325 allows a user to control the selection of additional content by rolling their finger (or stylus, pen, or other object used to create the touch) at the location of the touch. In certain exemplary embodiments, the touch module 115 may allow the user to control the speed of the selection by rolling their finger. For example, if the user rolls their finger in a first direction, additional content may be selected at a first speed. Likewise, if the user rolls their finger in a second direction, additional content may be selected at a second speed, which is different than the first speed.

In addition or in the alternative, the touch module 115 may allow the user to control the direction of selection by rolling their finger. For example, if the user rolls their finger to the left with respect to the location of the touch, the selection of additional content my expand (or contract) to the left. Likewise, if the user rolls their finger to the right the selection of additional content may expand (or contract) to the right. The method 325 is described below with reference to FIGS. 1, 2, and 7.

In step 705, the touch module 115 expands the content at a first speed and in a first direction while a touch remains active at the touch screen 160. Initially, additional content may be selected in a "forward" direction at the first speed. For example, if the displayed content includes text, a forward direction may be from left to right similar to that of sentence flow. The initial speed may be a slow speed to allow the user to select a small amount of additional content.

In step 710, the touch module 115 interacts with the touch screen controller 161 to determine if the user has rolled its finger at the location of the touch at the touch screen 160. In certain exemplary embodiments, the touch module 160 can monitor pixels or virtual pixels adjacent to the location of the touch to determine whether the user has rolled its finger and in what direction the finger was rolled. For example, if pixels to the left of the initial location of the touch that previously did not indicate a touch subsequently indicate that a touch has occurred and pixels at the right side of the location of the touch that previously indicated a touch subsequently do not indicate a touch, then the touch module 115 can conclude that the user has rolled its finger to the left. This determination can include a time parameter such that a user moving their finger across the touch screen 160 is not determined to be a finger roll. If the touch module 115 determines that the user has rolled their finger, then the method 325 proceeds to step 715. If the touch module 115 determines that the user has not rolled their finger, the method returns to step 705.

In step 715, the touch module 115 expands the selection of additional content based on the user's finger roll. As described above, the touch module 115 can allow the user to control the direction and/or the speed for selecting additional content by rolling their finger. For example, a rule may provide that the roll of the user's finger to the left with respect to the touch screen 160 lowers the speed of expansion and a roll of the user's finger to the right with respect to the touch screen 160 increases the speed of expansion. In another example, a rule may provide that the roll of a user's finger to the left with respect to the touch screen 160 expands or contracts the selection to the left and a roll of the user's finger to the right expands or contracts the selection to the right. Although the directions of left and right are used in the above examples, any direction or combination of directions can be used.

In step 720, the touch module 115 determines whether the touch has been removed. Although this step is depicted as occurring after step 715, the touch module 115 can continuously interact with the touch screen controller 161 to determine whether the touch is active or has been removed. While the touch remains active, the touch module 115 can continue to select additional content and adjust the direction and/or speed of selection based on the user rolling their finger (or other object) at the location of the touch. After the touch is removed, the method 325 proceeds to step 230 of the method 200, as referenced in FIG. 2.

To better illustrate the exemplary method 325, the following example is provided. FIG. 9 is a block diagram 900 depicting a selection of displayed content 815, in accordance with certain exemplary embodiments. In this example, the touch module 115 allows a user to control the direction of selection by rolling their finger in the direction that the user wants the selection to expand or contract. Referring to view 901 of FIG. 9, a user has selected a first portion 915A of the displayed content 915 at a time 12:00:00 (as illustrated by clock 805) by touching the touch screen 160 at the first portion 915A. The first portion 915A includes the text "1234" and the selection of the first portion is indicated by an underline indicator 916.

In view 902, the user has rolled their finger 810 to the right with respect to the touch screen 160. Accordingly, the touch module 115 expands the selection to include a second portion of text 915B to the right of the initial selection 915A at time 12:00:03. The second portion 915B includes the text "Some Road, New York, N.Y. Let." In this example, the user is attempting to select the text "1234 Some Road, New York, N.Y." However, the expansion also includes the text "Let" to the right of the desired text. To correct this, the user can roll their finger 810 to the left as shown in view 903 to contract the selection to the left and de-select the text "Let." At this point, the user can remove their finger 810 from the touch screen 160 so that only the desired text is indicated by the indicator 916. Thereafter, the user may perform an action in connection with the selected text 915C, such as copying the text 915C and pasting the text 915C into a GPS application, for example.

General

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

The exemplary embodiments can be used with computer hardware and software that performs the methods and processing functions described above. As will be appreciated by those skilled in that art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method, comprising:
receiving, at a processor, an indication of a first touch input entered at a first location of a touch display at which content is being displayed;
in response to receiving the indication of the first touch input, selecting, by the processor, a first portion of the content;
outputting, by the processor, for display, an indication of a selection of the first portion of the content;
in response to receiving, at the processor, an indication of a second touch input beginning at the first location of the touch display and ending at a second location of the touch display proximate to the first location, changing the selection of the first portion of content to include a second portion of the content, wherein:
the second touch input comprises a first rolling, in a first direction, of a finger used to enter the second touch input, and, without removing the finger from the touchscreen in between, a second rolling, in a second direction opposite to the first direction, of the finger used to enter the second touch input, and
the processor expands the selection to include more of the second portion of the content responsive to the first rolling, and contracts the selection to include less of the second portion of the content responsive to the second rolling;
and
outputting, by the processor, for display, the indication of the selection of the content to include the second portion of the content.

2. The method of claim 1, wherein the second touch input from the first location to the second location of the touch display is determined by monitoring, by the processor, pixels directly adjacent to pixels at the first location of the touch display.

3. The method of claim 1, further comprising:
receiving, at the processor, a command to perform an action in connection with the selection of the content; and
performing, by the processor, the action in connection with the selection of the content.

4. The method of claim 3, wherein the action includes at least one of changing a format of the selection of the content, copying the selection of the content, and editing the selection of the content.

5. The method of claim 1, wherein the selection of the content includes at least one of text, an image, a picture, and a graphic.

6. The method of claim 1, wherein the indication of the selection of the content includes at least one of a highlight displayed proximate the selection of the content, an underline displayed under the selection of the content, a change in color of the selection of the content, and a start indicator displayed at a beginning of the selection of the content and an end indicator displayed at an end of the selection of the content.

7. The method of claim 1, further comprising:
changing, by the processor, a rate of expansion of the selection to include the second portion of the content responsive to determining that the selection of the content exceeds a predetermined content selection threshold.

8. The method of claim 1, further comprising:
adjusting, by the processor, a rate of expansion of the selection to include the second portion of the content based on at least one rule.

9. A system, comprising:
a touch display;
a processor;
a memory operatively coupled to the at least one processor and configured for storing data and instructions that, when executed by the processor, cause the computing device to perform a method comprising:
receiving, at the processor, an indication of a first touch input entered at a first location of the touch display at which content is being displayed;
in response to receiving the indication of the first touch input, selecting, by the processor, a first portion of the content;
outputting, by the processor, for display, an indication of a selection of the first portion of the content;
in response to receiving, at the processor, an indication of a second touch input beginning at the first location of the touch display and ending at a second location of the touch display proximate to the first location, changing the selection of the first portion of content to include a second portion of the content, wherein:
the second touch input comprises a first rolling, in a first direction, of a finger used to enter the second touch input, and, without removing the finger from the touchscreen in between, a second rolling, in a second direction opposite to the first direction, of the finger used to enter the second touch input, and
the processor expands the selection to include more of the second portion of the content responsive to the first rolling, and contracts the selection to include less of the second portion of the content responsive to the second rolling; and
outputting, by the processor, for display, the indication of the selection of the content to include the second portion of the content.

10. The system of claim 9, wherein the second touch input from the first location to the second location of the touch display is determined by monitoring pixels adjacent to the first location of the touch display.

11. The system of claim 9, the method further comprising:
receiving a command to perform an action in connection with the selection of the content; and
performing the action on the selection of the content.

12. The system of claim 11, wherein the action comprises at least one of changing a format of text in the selection of the content, copying the selection of the content; and editing the selection of the content.

13. The system of claim 9, wherein the selection of the content includes at least one of text, an image, a picture, and a graphic.

14. The system of claim 9, wherein the indication of the selection of the content includes at least one of a highlight displayed proximate the selection of the content, an underline displayed under the selection of the content, a change in color of the selection of the content, and a start indicator displayed at a beginning of the selection of the content and an end indicator displayed at an end of the selection of the content.

15. The system of claim 9, the method further comprising:
changing a rate of expansion of the selection to include the second portion of the content responsive to determining that the selection exceeds a predetermined content selection threshold.

16. The system of claim 9, wherein the the method further includes:
   adjusting a rate of expansion of the selection to include the second portion of the content based on at least one rule.

17. A non-transitory computer-readable storage medium having a computer program embodied therein, the computer program representing computer-executable instructions to cause a processor to perform operations including:
   receiving, at the processor, an indication of a first touch input entered at a first location of a touch display at which content is being displayed;
   in response to receiving the indication of the first touch input, selecting, by the processor, a first portion of the content;
   outputting, by the processor, for display, an indication of a selection of the first portion of the content;
   in response to receiving, at the processor, an indication of a second touch input beginning at the first location of the touch display and ending at a second location of the touch display proximate to the first location, changing the selection of the first portion of content to include a second portion of the content, wherein:
      the second touch input comprises a first rolling, in a first direction, of a finger used to enter the second touch input, and, without removing the finger from the touchscreen in between, a second rolling, in a second direction opposite to the first direction, of the finger used to enter the second touch input, and
      the processor expands the selection to include more of the second portion of the content responsive to the first rolling, and contracts the selection to include less of the second portion of the content responsive to the second rolling; and
   outputting, by the processor, for display, the indication of the selection of the content to include the second portion of the content.

18. The non-transitory computer-readable storage medium of claim 17, wherein the second touch input from the first location to the second location of the touch display is determined by monitoring pixels adjacent to the first location of the touch display.

19. The non-transitory computer-readable storage medium of claim 17, wherein the operations further include:
   receiving a command to perform an action in connection with the selection of the content; and
   performing the action in connection with the selection of the content.

20. The non-transitory computer-readable storage medium of claim 19, wherein the action comprises at least one of changing a format of text in the selection of the content, copying the selection of the content; and editing the selection of the content.

21. The non-transitory computer-readable storage medium of claim 17, wherein the selection of the content includes at least one of text, an image, a picture, and a graphic.

22. The non-transitory computer-readable storage medium of claim 17, wherein the indication of the selection of the content includes at least one of a highlight displayed proximate the selection of the content, an underline displayed under the selection of the content, a change in color of the selection of the content, and a start indicator displayed at a beginning of the selection of the content and an end indicator displayed at an end of the selection of the content.

23. The non-transitory computer-readable storage medium of claim 17, wherein the operations include:
   changing a rate of expansion of the selection to include the second portion of the content responsive to determining that the selection exceeds a predetermined content selection threshold.

24. The computer-readable storage program of claim 17, wherein the operations further include:
   adjusting a rate of expansion of the selection to include the second portion of the content based on at least one rule.

* * * * *